US010331327B2

(12) United States Patent
Zou et al.

(10) Patent No.: US 10,331,327 B2
(45) Date of Patent: Jun. 25, 2019

(54) MESSAGE DISPLAY METHOD, APPARATUS AND TERMINAL (71) Applicant: China Mobile Communications Corporation, Beijing (CN)

(72) Inventors: Shu Zou, Beijing (CN); Huanglingzi Liu, Beijing (CN); Yaohong Zhao, Beijing (CN)

(73) Assignee: China Mobile Communications Corporation, Beijing (CN)

(*) Notice: Subject to any disclaimer, the term of this patent is extended or adjusted under 35 U.S.C. 154(b) by 188 days.

(21) Appl. No.: 15/447,313

(22) Filed: Mar. 2, 2017

(65) Prior Publication Data

US 2017/0177186 A1 Jun. 22, 2017

Related U.S. Application Data (63) Continuation of application No. PCT/CN2015/079341, filed on May 20, 2015.

(30) Foreign Application Priority Data

Sep. 2, 2014 (CN) .......................... 2014 1 0444236

(51) Int. Cl.
G06F 3/0485 (2013.01)
G06F 3/0482 (2013.01)
G06F 3/0484 (2013.01)
G06F 3/0488 (2013.01)
(Continued)

(52) U.S. Cl.
CPC ............ *G06F 3/0485* (2013.01); *G06F 3/013* (2013.01); *G06F 3/0482* (2013.01); *G06F 3/04845* (2013.01); *G06F 3/04883* (2013.01); *G06F 3/167* (2013.01); *G06F 2203/04803* (2013.01)

(58) Field of Classification Search
CPC ............................ G06F 3/0485; G06F 3/0482
See application file for complete search history.

(56) References Cited

U.S. PATENT DOCUMENTS

2002/0156807 A1* 10/2002 Dieberger ............... G06F 3/016
715/247
2003/0014490 A1* 1/2003 Bates ................... G06Q 10/107
709/206
2007/0150485 A1* 6/2007 Uittenbogaard ...... G06F 3/0482
(Continued)

FOREIGN PATENT DOCUMENTS

CN 101547247 A 9/2009
CN 102629181 A 8/2012
(Continued)

OTHER PUBLICATIONS

Written Opinion for International Application No. PCT/CN2015/079341, dated Aug. 17, 2015, 5 pages.
(Continued)

Primary Examiner — Li P Sun
(74) Attorney, Agent, or Firm — Mintz Levin Cohn Ferris Glovsky and Popeo, P.C.; Kongsik Kim; Carolina Säve (57) ABSTRACT Disclosed is a message display method. In the display method, a first message is received, a second message on a current display interface is detected and one or more messages between the first message and the second message are hidden. A message display apparatus and a terminal are also disclosed.

16 Claims, 9 Drawing Sheets (51) Int. Cl.
  *G06F 3/01* (2006.01)
  *G06F 3/16* (2006.01)

(56) References Cited

U.S. PATENT DOCUMENTS

| | | | |
|---|---|---|---|
| 2008/0134724 A1 | 6/2008 | Soultz et al. | |
| 2014/0256295 A1 | 9/2014 | Peng et al. | |
| 2015/0143294 A1* | 5/2015 | Piccinato | G06F 3/0482 |
| | | | 715/817 |
| 2015/0193094 A1* | 7/2015 | Armitage | G06F 17/30994 |
| | | | 715/825 |

FOREIGN PATENT DOCUMENTS

| | | |
|---|---|---|
| CN | 103051516 A | 4/2013 |
| CN | 103135967 A | 6/2013 |
| CN | 103473004 A | 12/2013 |
| CN | 103699369 A | 4/2014 |
| CN | 103870464 A | 6/2014 |
| CN | 103914549 A | 7/2014 |

OTHER PUBLICATIONS

International Search Report for International Application No. PCT/CN2015/079341, dated Aug. 17, 2015, 2 pages.

* cited by examiner

MESSAGE DISPLAY METHOD, APPARATUS AND TERMINAL

CROSS REFERENCE TO RELATED APPLICATIONS

This application is a continuation of International Application No. PCT/CN2015/079341 filed on May 20, 2015, which claims priority to Chinese Patent Application No. 201410444236.4 filed on Sep. 2, 2014, the entire disclosures of which are incorporated herein by reference.

TECHNICAL FIELD

The present disclosure relates to terminal display techniques, and in particular to a message display method, apparatus and terminal.

BACKGROUND

With social networks or news websites and smart mobile phones becoming increasingly prevalent, more and more social applications or news applications for smart mobile phones emerge. The social applications or news applications cannot show too many messages on a single screen page due to size limitation of screens of the smart mobile phones. Thus, when there are many messages, a user may only read the messages in a chronological order, i.e., from latest to earliest or from earliest to latest. Furthermore, a smartphone cannot load all the messages in a short time due to capability limitation of the smart mobile phone. Thus, a user, after performing page-turning, may have to wait a certain period for completion of loading a new page.

The existing method for loading more earlier messages and refreshing the latest message on the top of the screen through clicking the "more" on the bottom of the screen or through the above-mentioned gesture after reading a certain number of messages, resulting in contemporaneously display of more previous contents at the bottom area and more new contents on the top area sometimes, may cause problems as follows.

1) When too many new messages emerge into the top of the list, the new messages may downwardly occupy much space. As a result, more read messages instead of more unread messages are currently displayed on the display screen.

2) The user cannot rapidly return to the top of the list to read the latest message. In some cases, an "one-key-return-to-top" button is provided, such that the button, when pressed by the user, automatically returns the user to the current top of the list. However, it is difficult to return the user to the previous position after reading the latest message on the top of the list.

SUMMARY

In order to solve the above technical problems in the prior art, the present disclosure mainly provides a message display method, apparatus and terminal.

The technical solution of the disclosure may be implemented as follows.

The disclosure provides a message display method, which may include: receiving a first message, detecting a second message on a current display interface and hiding a message between the first message and the second message.

In an embodiment, the first message may be a new unread message, and the second message may be a message which is received earlier than other messages on the current display interface.

In an embodiment, the detecting the second message on the current display interface may include: upon reception of a gesture command or upon detection of pressing of a prompt button displayed on the display interface, detecting a reception time for each message on the current display interface and determining one of the messages which has an earliest reception time on the current display interface as the second message.

In an embodiment, the hiding a message between the first message and the second message may include: determining a message to be hidden based on reception times of the first message and the second message, and then hiding the determined message.

In an embodiment, the display method may further include: displaying an identifier of the hidden message as a stacked line between the first message and the second message on the display interface, or displaying the identifier of the hidden message as a highlighted color block between the first message and the second message on the display interface.

In an embodiment, the display method may further include: moving the identifier of the hidden message on the display interface in accordance with the gesture command, to display the first message on the display interface.

In an embodiment, the display method may further include: unhiding and expanding the message between the first message and the second message, when the first message is slid completely out of the display interface in accordance with the gesture command.

The disclosure also provides a message display apparatus, which may include a reception module, a detection module and a display hiding module. The reception module is configured to receive a first message and notify the detection module and the display hiding module of the first message. The detection module is configured to detect a second message on a current display interface and notify the display hiding module of the second message. The display hiding module is configured to hide a message between the first message and the second message.

In an embodiment, the detection module is further configured to: upon reception of a gesture command or upon detection of pressing of a prompt button displayed on the display interface, detect a reception time for each message on the current display interface, and determine one of the messages which has an earliest reception time on the current display interface as the second message.

In an embodiment, the display hiding module may be further configured to: determine a message to be hidden based on the reception times of the first message and the second message, and hide the determined message.

In an embodiment, the display hiding module may be further configured to: display an identifier of the hidden message as a stacked line between the first message and the second message on the display interface, or display the identifier of the hidden message as a highlighted color block between the first message and the second message on the display interface.

In an embodiment, the display apparatus may further include a gesture identification module which is configured to receive a gesture command and send the gesture command to the display hiding module; and the display hiding module may be further configured to move the identifier of the hidden message on the display interface in accordance with the gesture command, to display the first message.

In an embodiment, the display hiding module may be further configured to unhide and expand the message between the first message and the second message, when the first message is completely slid out of the display interface in accordance with the gesture command.

The disclosure also provides a terminal including the display apparatus.

The disclosure provides a method, apparatus and terminal for displaying messages. A first message may be received, a second message on a current display interface may be detected and one or more messages between the first message and the second message may be hidden. In this way, the currently read message can be still immediately adjacent to a new message when the terminal receives the new message, and the problem that the user cannot be returned to the previously read message when a new message is received is solved.

DETAILED DESCRIPTION

According to an embodiment of the disclosure, a first message is received, a second message on a current display interface is detected, and one or more messages between the first message and the second message are hidden. Here, the first message is a new message, and the number of the first message(s) may be one or more. The second message is a message which is received earlier than other messages on the current display interface.

In the following, the disclosure will be described in detail in conjunction with the appended drawings and the embodiments.

Increasingly, mobile applications such as social applications and news applications are springing up as well as social networks and news websites being spread across. Typically, these applications may provide a large number of contents listed in a particular order. However, to facilitate portability, many mobile computing devices include displays of limited size to thereby decrease the overall size of the device and cause the number of contents displayed on the device is limited by the size of its screen.

In an example, the contents may be listed in chronological order (or in reverse chronological order). In circumstance of chronological order, on the top area of the mobile device screen displays the latest contents while the earliest contents at the bottom area, a user may scroll down to read more contents displayed within the current page. Also, a user may get more previous contents by clicking a "MORE" button to generate and display a following page, or request more new contents from server by refreshing the current page, which would probably be displayed on the top area of the screen.

In another example, the contents may be listed in hotness order, i.e., the content item that has attracted the most public concern is placed on the top area of the mobile device screen.

In yet another example, the contents may be listed in type order, i.e., the content items, also referred to as messages, may be classified as social messages, financial messages, entertainment messages, sports messages, and the like, and each type of the messages are arranged in a respective list.

Figure 1:
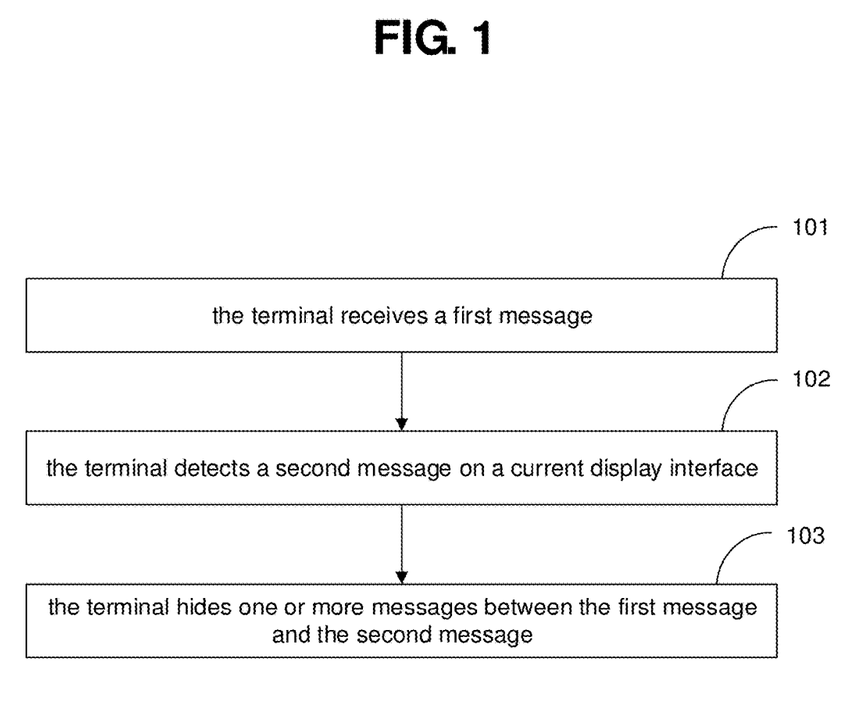
FIG. 1 is a flow chart of a message display method according to an embodiment of the disclosure.

An embodiment of the disclosure provides a message display method. As shown in FIG. 1, the method includes the following steps.

Step 101: a terminal receives a first message.

Here, the first message is a new message and the number of the first message(s) may be one or more.

Step 102: the terminal detects a second message on a current display interface.

Here, the second message is a message which is received earlier than other messages on the current display interface.

Specially, when the terminal receives a gesture command or detects that a prompt button displayed on the display interface is pressed, the terminal detects a reception time for each message displayed on the current display interface and determines one of the messages which has an earliest reception time on the current display interface as the second message. The gesture command may be upward sliding or downward sliding.

Step 103: the terminal hides one or more messages between the first message and the second message.

Specially, the terminal determines one or more messages to be hidden based on reception times of the first message and the second message, and then hides the determined message(s). In order to mark the hidden message(s), the terminal displays an identifier of each hidden message as a stacked line between the first message and the second message on the display interface, or displays the identifier of each hidden message as a highlighted color block between the first message and the second message on the display interface. Furthermore, the terminal may present a reception time range of the hidden message(s) on the identifier of the hidden message(s).

According to one embodiment, the terminal moves the identifier of the hidden message(s) on the display interface in accordance with the gesture command, so as to display the first message on the display interface. For example, the identifier of the hidden message(s) is at the top, the gesture command is downward sliding, and thus the first message will be gradually slid into the screen page from the top along with the identifier and displayed.

According to another embodiment, when the terminal slides the first message completely out of the screen page, the terminal unhides and expands the message(s) between the first message and the second message.

According to yet another embodiment, when the terminal does not receive the first message, the terminal displays messages in accordance with a "sliding" gesture command and displays a prompt button on the display interface. When the prompt button is pressed, the terminal detects a second message on the current display interface, and moves the second message as a message with the earliest reception time on a next display interface to the top or bottom for display. That is, the second message squeezes out the messages on the current display interface which have a reception time later than the second message. For example, when the display interface displays messages in a chronological order from earliest to latest and from top to bottom, the terminal moves the second message as a message with the latest reception time on the next display interface, to the bottom for display, and a number of other messages having earlier reception times than that of the second message are also sequentially moved downwards to be displayed above the second message on said next display interface. When the display interface displays messages in a chronological order from earliest to latest and from bottom to top, the terminal moves the second message as a message with the latest reception time on the next display interface, to the top for display, and a number of other messages having earlier reception times than that of the second message are also sequentially moved upwards to be displayed below the second message on said next display interface. When the second message is already located at the top or the bottom and thus the next display interface emerges without a moving effect, a prompt message is displayed. Here, the prompt button may be "more messages", "next page of messages" etc., and the prompt message may be "loaded", "loading completed" etc.

Figure 2:
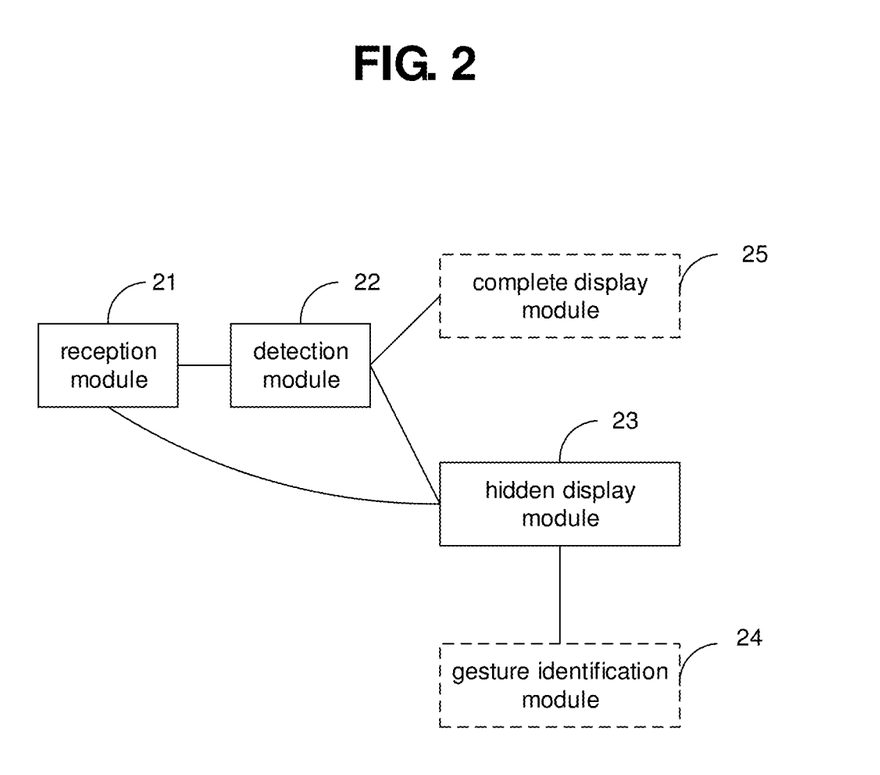
FIG. 2 is a block diagram of a message display apparatus according to an embodiment of the disclosure.

Based on the above method, an embodiment of the disclosure further provides a message display apparatus. As shown in FIG. 2, the display apparatus includes: a reception module 21, a detection module 22, and a display hiding module 23.

The reception module 21 is configured to receive a first message and notify the detection module 22 and the display hiding module 23 of the first message.

The detection module 22 is configured to detect a second message on a current display interface and notify the display hiding module 23 of the second message.

The display hiding module 23 is configured to hide a message between the first message and the second message.

Specially, upon reception of a gesture command or upon detection of pressing of a prompt button displayed on the display interface, the detection module 22 detects a reception time for each message on the current display interface, and determines one of the messages which has an earliest reception time on the current display interface as the second message. The display hiding module 23 determines one or more messages to be hidden based on the reception times of the first message and the second message, and hides the determined message(s). In order to mark the hidden message(s), the display hiding module 23 displays an identifier of the hidden message(s) as a stacked line between the first message and the second message on the display interface, or displays the identifier of the hidden message(s) as a highlighted color block between the first message and the second message on the display interface.

The display apparatus further includes a gesture identification module 24 which is configured to receive a gesture command and send the gesture command to the display hiding module 23.

The display hiding module 23 is further configured to move the identifier of the hidden message(s) on the display interface in accordance with the gesture command, so as to display the first message.

The display hiding module 23 is further configured to unhide and expand the message(s) between the first message and the second message, when the first message is completely slid out of the display interface.

Preferably, when the detection module 22 does not receive the notification that the first message is received by the reception module 21, the detection module 22 detects a second message on the current display interface and notifies a complete display module 25 of the second message, upon detection of pressing of the prompt button displayed on the display interface.

Accordingly, the complete display module 25 moves the second message as a message with the latest reception time on a next display interface, to the top or bottom for display, that is, the second message squeezes out one or more messages with a reception time later than the second message on the current display interface.

Based on the above apparatus, the disclosure further provides a terminal including the message display apparatus as shown in FIG. 2.

In the following, the method according to the embodiment of the disclosure will be illustrated in conjunction with a specific application scenario.

Figure 3:
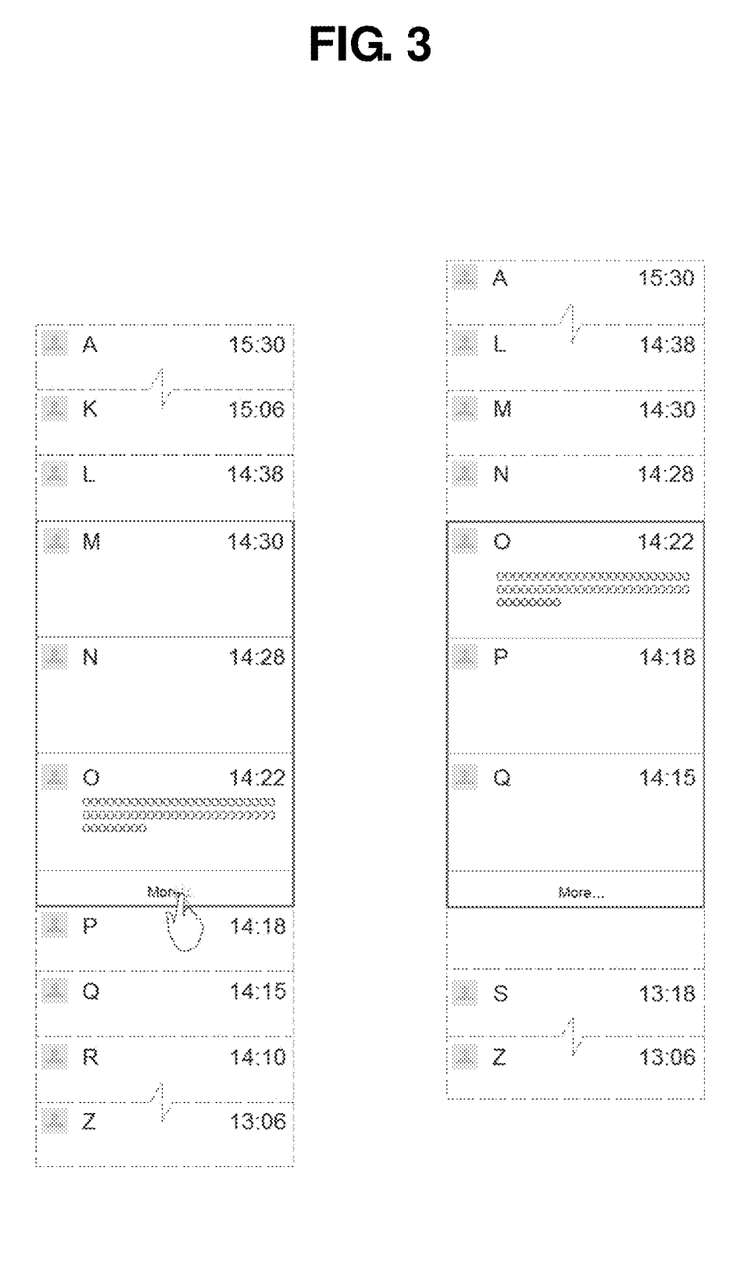
FIG. 3 is an original state diagram of a screen page presenting messages according to an embodiment of the disclosure.
Figure 4:
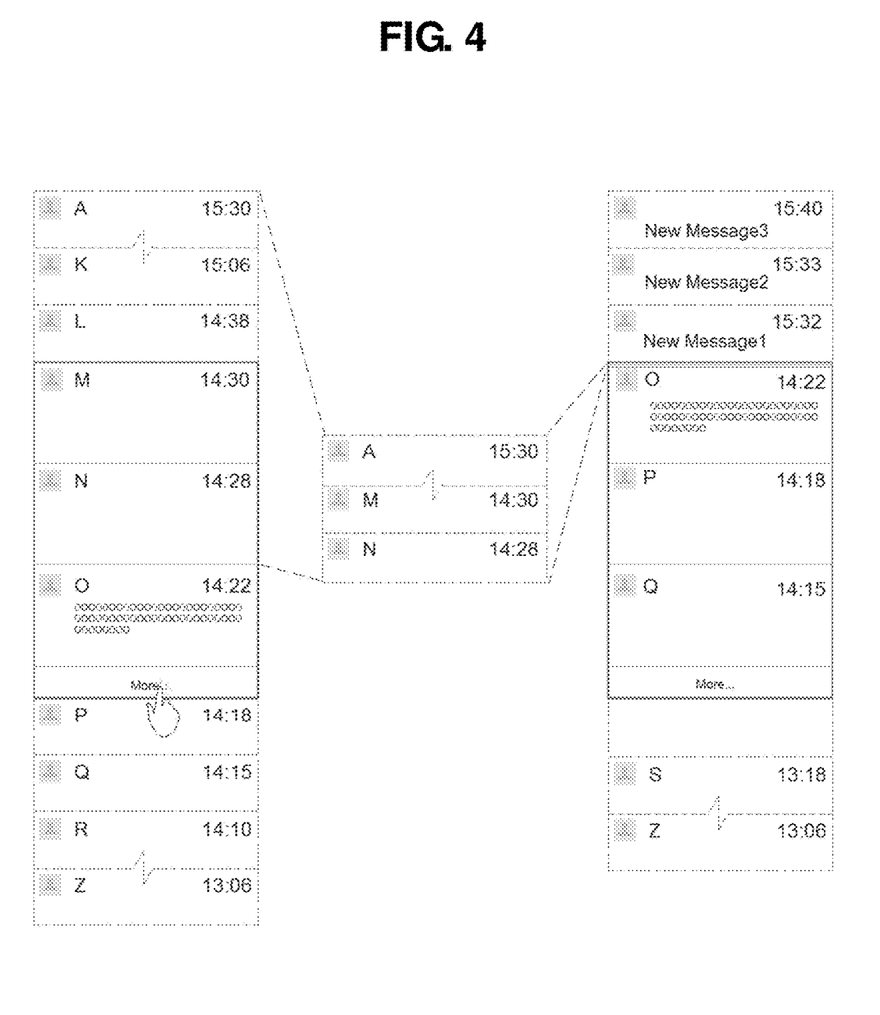
FIG. 4 is a state diagram of the screen page presenting that there are new messages according to an embodiment of the disclosure.

In this embodiment, messages from latest to earliest are denoted by A, B, C, D, . . . , Z respectively. For example, the message A is issued at 15:30 pm and is the latest message. The message Z is issued at 13:06 pm and is the earliest message. As shown in FIG. 3, the messages presented on the current screen page are messages M, N and O, where the message O is the earliest message of the messages M, N and O. When the user wants to downwardly read more messages, the user may load more messages through clicking "more" or through a "upward-sliding-and-releasing" gesture. In this case, when the terminal does not yet receive a new message, the message O is automatically moved upwards to the top, meanwhile the message P and the message Q are moved to the middle and the bottom of the page respectively. When the terminal receives a new message, for example, as shown in FIG. 4, when the terminal receives three new messages, i.e., a third new message New Message 3, a second new message New Message 2 and a first new message New Message 1, the history messages A, B, C, . . . , M, N will be hidden and identified using two stacked lines which have a small separation therebetween and are presented on the top of the message O. The messages O, P, and Q are still displayed on the current screen as shown in FIG. 3.

Figure 5:
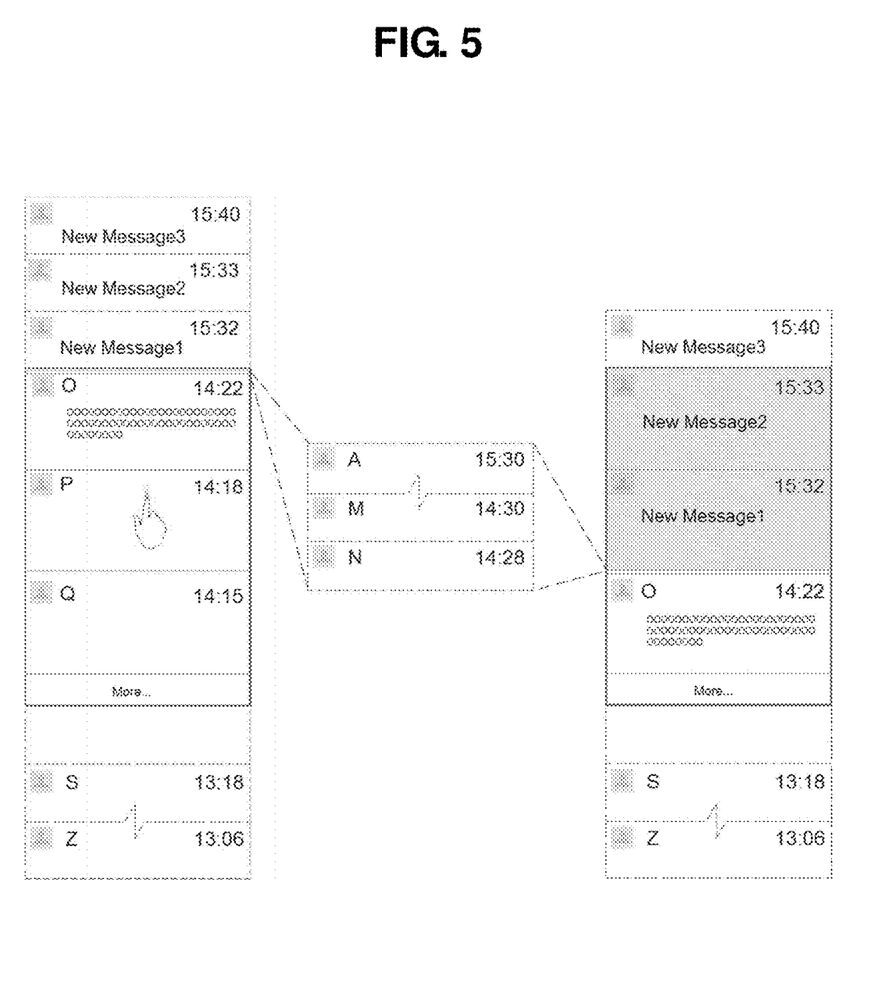
FIG. 5 is a state diagram of the screen page presenting that the new message is being read according to an embodiment of the disclosure.

At this time, if the user does not want to read a new message immediately, the user may continue to downwardly read the history messages which are just loaded. If the user wants to read the new message at the top immediately, as shown in FIG. 5, the user just makes a "downward-sliding" gesture using his/her finger and then the new messages New Message 1 and New Message 2 are displayed in grey, which indicates that the messages New Message 1 and New Message 2 are new and unread messages. At this time, the messages A, B, C, . . . , M, N are still be hidden and are identified as two stacked lines.

Figure 6:
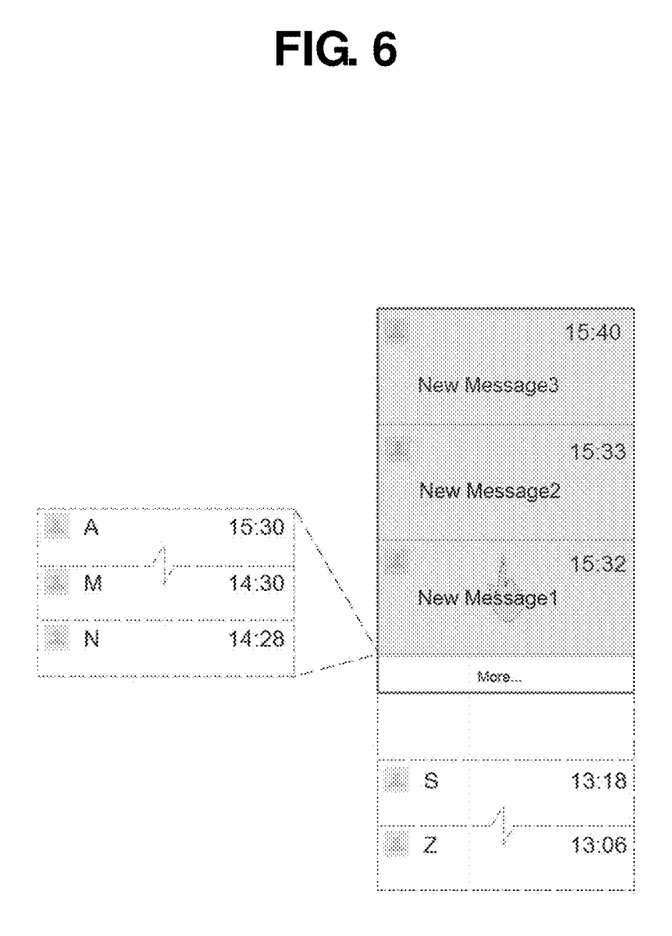
FIG. 6 is a state diagram of the screen page presenting that the new messages is being read up and down according to an embodiment of the disclosure.

The user may read new messages up and down within the new messages by using gesture commands. As shown in FIG. 6, the messages A to N are still be hidden and represented as two stacked lines. At this point, a reception time range of the messages A to N, for example, "15:30-

14:28", may be added between the two stacked lines to provide sufficient prompt to the user.

Figure 7:
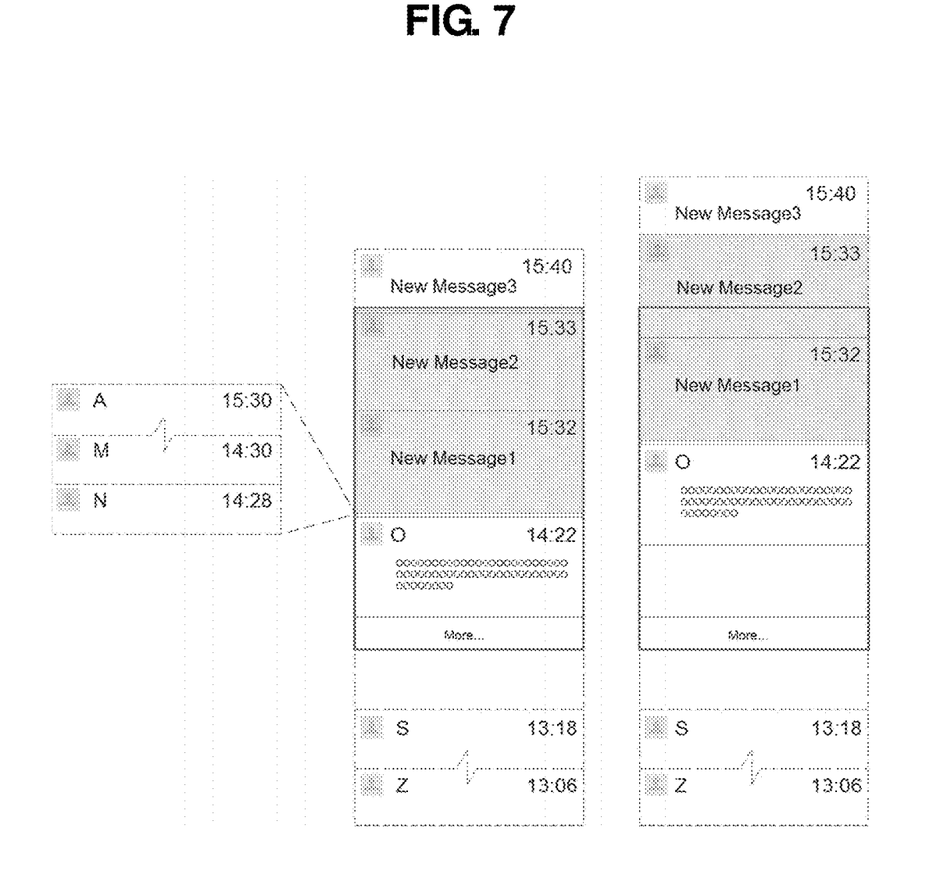
FIG. 7 is a state diagram of the screen page presenting a process of pushing the new messages out of the screen page according to the embodiment of the disclosure.
Figure 8:
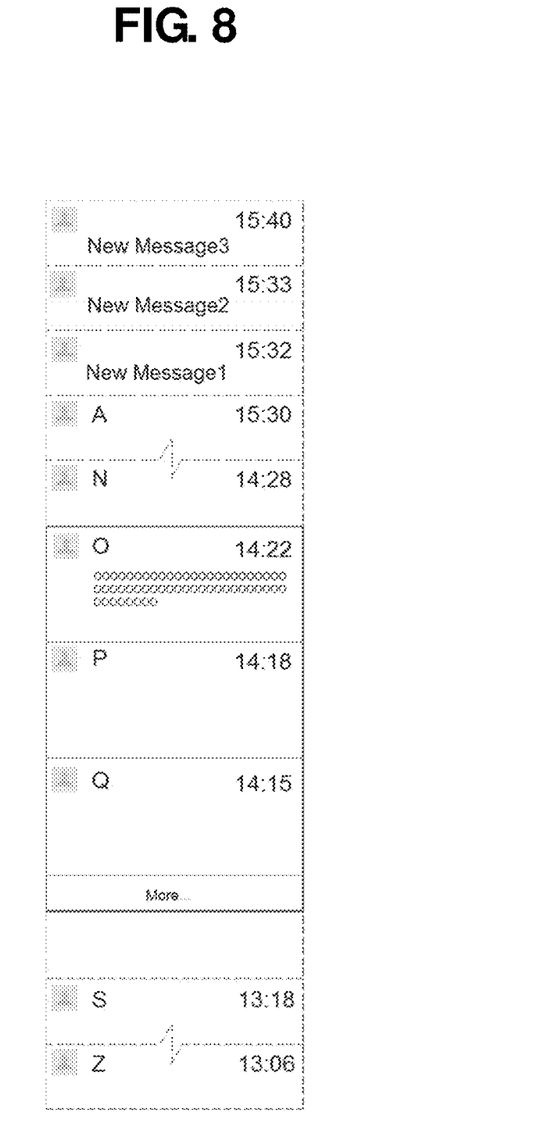
FIG. 8 is a state diagram of the screen page after the new messages are pushed out of the screen page according to the embodiment of the disclosure.

When the user has read all of the new messages, the user may push the earliest message New Message 1 of the three new messages out of the screen page. As shown in FIG. 7 and FIG. 8, the terminal may unhide and expand the messages A to N, and thus the messages A to N may be recovered to be displayed in an original list form.

Figure 9:
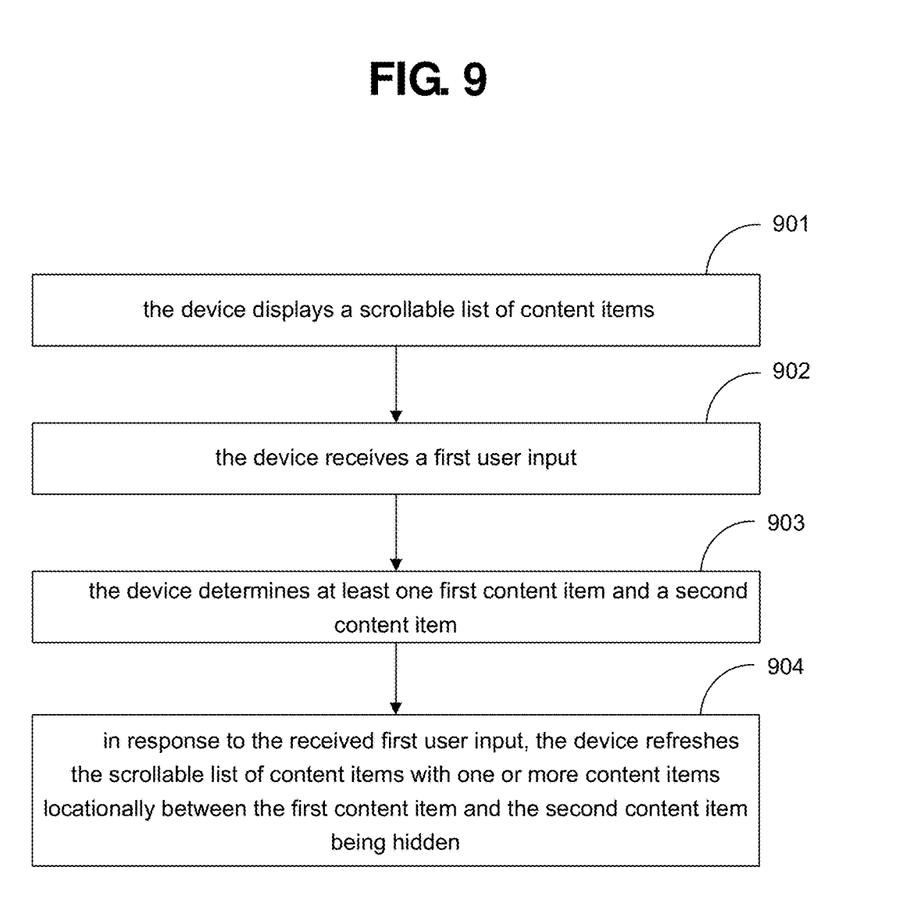
FIG. 9 is a flow chart of a method for displaying content items according to an embodiment of the disclosure.

FIG. 9 is a flow chart of a method for displaying content items according to an embodiment of the disclosure. The method may be applied in a computing device, such as a mobile terminal. As shown in FIG. 9, the method includes the following steps.

Step 901: the device displays a scrollable list of content items.

Step 902: the device receives a first user input.

In a specific application, when the user wants to read more content items by scrolling the list, he/she may issue a gesture command by down sliding his/her fingers on the screen, as the first user input. Besides the gesture command, the first user input may also be pressing of a prompt button, an eye movement track, or a voice input. In an example, the user may click the "more" on the bottom of the screen. In an example, the device may capture images which reflect the user's eye movement track, and then analyse the particular content item which the user is reading from the images, such that the device may be able to make further decisions based on the analysis. In an example, the device may collect the user's voice input through a microphone in the device and execute corresponding actions.

Step 903: the device determines at least one first content item and a second content item.

In an example, the device determines at least one first content item by receiving the at least one first content item in response to the received first user input.

Here, the first content item may include at least one new coming content item and the second content item, different from the first content item, has already been displayed within a current screen page on the computer device as one of: a content item that has an earliest timestamp among all the content items displayed within the current screen page, a content item that is displayed on a most extreme border position within the current screen page, or a content item that has already been read by a user.

Step 904: in response to the received first user input, the scrollable list of content items is refreshed with one or more content items locationally between the first content item and the second content item being hidden.

In an example, after the refreshing, the second content item or a content item next to the second content item is scrolled to top or bottom of the current screen page.

Here, the hidden content items may be identified as one of: a stacked line, a highlighted color block, a triangular arrowhead, a first letter or character as abstract.

In an example, the device may further receive a second user input, and in response to the received second user input, scroll the scrollable list of content items with the identifier of the hidden content items to display at least some of the first content item on the current screen page.

In a specific application, in the case that multiple first content items have been received, one or more content items locationally between the first content item and the second content item are hidden and identified as two stack lines which have a small separation therebetween, as shown in FIG. 5, if the user wants to read the refreshed new content items at the top immediately, the user may issue a gesture command, for example, make a "downward-sliding" gesture using his/her finger, as the second user input, and then at least some of the first content items are displayed in grey, which indicates that they are new and unread content items. At this time, the one or more content items locationally between the first content item and the second content item are hidden and identified as two stack lines.

Besides the gesture command, the second user input, similar to the first user input, may also be pressing of a prompt button, an eye movement track, or a voice input. The details will be omitted here.

In an example, the device may further receive a third user input, and in response to the received third user input, scroll the list of messages with the identifier of the hidden message on the current screen page to slide at least some of the first content item out of the current screen page; and unhide and expand the one or more content items between the first content item and the second content item, when the one or more first content items are completely slid out of the current screen page.

In a specific application, when the user has read all of the first content items, the user may issue a gesture command, for example, make a "upward-sliding" gesture using his/her finger, as the third user input, so as to push at least some of the first content item out of the screen page. As shown in FIG. 7 and FIG. 8, as a result, the one or more content items between the first content item and the second content item may be unhidden and expanded, and thus recovered to be displayed in an original list form.

Besides the gesture command, the third user input, similar to the first user input, may be pressing of a prompt button, an eye movement track, or a voice input. The details will be omitted here.

In an example, in response to determining that the scrollable list of content items have been refreshed, the device may provide audio feedback to the user.

The method as shown in FIG. 9 will further be described with connection to a specific application scenario. In this application scenario, the above described content item display method is implemented by means of a news client application installed in a mobile terminal, in which each content item is a news message. The news client application may provide several scrollable content item lists, each list corresponding to a new category, for example, social news, financial news, entertainment news, sports news, and etc. After the user starts the news client application through clicking a corresponding icon displayed in the touch screen of the mobile terminal, the news client application may display a default scrollable content item list in a chronological order in the screen, for example, the social news. After the news client application has been started for a time period, when the user wants to downwardly read more content items, the user may load more content items through clicking "more" or through a "upward-sliding-and-releasing" gesture as the first user input. In this case, when a new content item is not received, the content item at the bottom of the current screen page is automatically moved upwards to the top; when a new content item is received, which is referred to as the first content item, one or more content items locationally between the first content item and the second content item will be hidden and identified using two stacked lines which have a small separation therebetween and are presented above the content item at the top of the current screen page. At this time, if the user does not want to read a new content item immediately, the user may continue to downwardly read the history content items which are just loaded. If the user wants to read the new content item at the top immediately, the user just makes a "downward-sliding" gesture using his/her finger as the second user input and then the new content items are displayed in grey, which indicates that the content items are new and unread. At this time, the one or more content items locationally between the first content item and the second content item are still be hidden and are identified as two stacked lines. The user may read new content items up and down by using gesture commands. The one or more content items locationally between the first content item and the second content item are still be hidden and represented as two stacked lines. At this point, a reception time range of the content items, for example, "15:30-14:28", may be added between the two stacked lines to provide sufficient prompt to the user. When the user has read all of the new content items, the user may make an upward sliding gesture as the third user input, so as to push at least some of the new content items out of the screen page. At this time, the one or more content items locationally between the first content item and the second content item may be unhidden and expanded, and thus may be recovered to be displayed in an original list form.

According to the embodiments of the disclosure, when the terminal receives a new message, it enables the message being read currently to be immediately adjacent to the new message, and thus, the problem that the user cannot be returned to the previously read message after the user reads the new message is solved.

It is to be appreciated by those skilled in the art that embodiments of the disclosure can be provided as a method, system or computer program product. Therefore, the disclosure can be in the form of a hardware embodiment, a software embodiment or an embodiment combining both hardware and software. In addition, the disclosure can be in the form of a computer program product implemented on one or more computer usable storage media (including but not limiting to a magnetic disk storage and an optical storage) containing computer usable program codes.

The disclosure is described with reference to flow charts and/or block diagrams of the method, device (system) and computer program product according to embodiments of the disclosure. It should be appreciated that computer program instructions can be used to implement each process and/or block in flow charts and/or block diagrams and to implement the combination of processes and/or blocks in the flow charts and/or the block diagrams. Such computer program instructions can be provided to a processor of a general-purpose computer, a special-purpose computer, an embedded processor or other programmable data processing device so as to form a machine so that an instruction implemented by the processor of the computer or other programmable data processing device generates a device for implementing a function specified in one or more processes of a flow chart and/or one or more blocks of a block diagram.

Such computer program instructions can also be stored in a computer readable storage capable of directing a computer or other programmable data processing devices to operate in a specific way so that an instruction stored in the computer readable storage generates an artifact including an instructing device which can implement a function specified in one or more processes of a flow chart and/or one or more blocks of a block diagram.

Such computer program instructions can also be loaded onto a computer or other programmable data processing device so that a series of operation steps are implemented on the computer or other programmable data processing device to generate a computer-implemented processing and therefore an instruction implemented on the computer or other programmable devices provides a step for implementing a function specified in one or more processes of a flow chart and/or one or more blocks of a block diagram.

The embodiments described above are merely preferred embodiments of the disclosure and are not intended to limit the protection scope of the disclosure. Any modifications, equivalents and improvements made within the spirit and principle of the disclosure may fall within the protection scope of the disclosure.

What is claimed is:

1. A method for displaying content items on a computing device, the method comprising:
    displaying, on the computing device, a scrollable list of content items;
    receiving, on the computing device, a first user input;
    determining, on the computing device, at least one first content item and a second content item;
    in response to the received first user input, refreshing the displayed scrollable list of content items on the computing device to hide one or more content items located between the first content item and the second content item as a displayed identifier on a current screen page;
    receiving a second user input;
    in response to the received second user input, scrolling the scrollable list of content items with moving the displayed identifier of the hidden content items on the current screen page to display at least some of the first content item;
    receiving a third user input;
    in response to the received third user input, scrolling the scrollable list of content items with moving the displayed identifier of the hidden content items on the current screen page to slide at least some of the first content item out of the current screen page; and
    unhiding and expanding the one or more content items between the first content item and the second content item, in response to at least the first content item being completely slid out of the current screen page.

2. The method of claim 1, wherein the first content item includes at least one new coming content item and the second content item, different from the first content item, has already been displayed within the current screen page on the computer device as one of: a content item that has an earliest timestamp among all the content items displayed within the current screen page, a content item that is displayed on a most extreme border position within the current screen page, or a content item that has already been read by a user.

3. The method of claim 1, wherein the first user input is one of: a gesture command, pressing of a prompt button, an eye movement track, or a voice input.

4. The method of claim 1, wherein after the refreshing, the second content item or a content item next to the second content item is scrolled to top or bottom of the current screen page.

5. The method of claim 1, wherein the hidden content items are identified as one of: a stacked line, a highlighted color block, a triangular arrowhead, a first letter or character as abstract.

6. The method of claim 1, wherein determining, on the computing device, at least one first content item comprises:
    in response to the received first user input, receiving the at least one first content item.

7. The method of claim 1, further comprising:
    in response to determining that the scrollable list of content items have been refreshed, providing audio feedback.

8. The method of claim 1, wherein the scrollable list of content items includes a plurality of discrete content items arranged in at least one of chronological, hotness, or type order.

9. A computing device, comprising:
a processor; and
a memory for storing instructions executable by the processor, wherein the processor is configured to:
displaying, on the computing device, a scrollable list of content items;
receive, on the computing device, a first user input;
determine, on the computing device, at least one first content item and a second content item;
in response to the received first user input, refresh the displayed scrollable list of content items on the computing device to hide one or more content items displayed and located between the first content item and the second content item as a displayed identifier on a current screen page;
receive a second input;
in response to the received second user input, scroll the scrollable list of content items with moving the displayed identifier of the hidden content items on the current screen page to display at least some of the first content item;
receive a third user input;
in response to the received third user input, scroll the scrollable list of content items with moving the displayed identifier of the hidden content items on the current screen page to slide at least some of the first content item out of the current screen page; and
unhide and expand the one or more content items between the first content item and the second content item, in response to at least the first content item being completely slid out of the current screen page.

10. The computing device of claim 9, wherein the first content item includes at least one new coming content item and the second content item, different from the first content item, has already been displayed within the current screen page on the computer device as one of: a content item that has an earliest timestamp among all the content items displayed within the current screen page, a content item that is displayed on a most extreme border position within the current screen page, or a content item that has already been read by a user.

11. The computing device of claim 9, wherein the first user input is one of: a gesture command, pressing of a prompt button, an eye movement track, or a voice input.

12. The computing device of claim 9, wherein after the refreshing, the second content item or a content item next to the second content item is scrolled to top or bottom of the current screen page.

13. The computing device of claim 9, wherein the hidden content items are identified as one of: a stacked line, a highlighted color block, a triangular arrowhead, a first letter or character as abstract.

14. The computing device of claim 9, wherein the processor is configured to:
in response to the received first user input, receive at least one first content item.

15. The computing device of claim 9, wherein the processor is further configured to:
in response to determining that the scrollable list of content items have been refreshed, provide audio feedback.

16. A non-transitory computer-readable medium, comprising computer-executable instructions stored thereon that, when executed by a processor, cause the processor to perform a method for displaying content items on a computing device, the method comprising:
displaying, on the computing device, a scrollable list of content items;
receiving, on the computing device, a first user input;
determining, on the computing device, at least one first content item and a second content item;
in response to the received first user input, refreshing the displayed scrollable list of content items on the computing device to hide one or more content items displayed and located between the first content item and the second content item as a displayed identifier on a current screen page;
receiving a second user Input;
in response to the received second user input, scrolling the scrollable list of content items with moving the displayed identifier of the hidden content items on the current screen page to display at least some of the first content item;
receiving a third user input;
in response to the received third user input, scrolling the scrollable list of content items with moving the displayed identifier of the hidden content items on the current screen page to slide at least some of the first content item out of the current screen page; and
unhiding and expanding the one or more content items between the first content item and the second content item, in response to at least the first content item being completely slid out of the current screen page.

* * * * *